Sept. 11, 1934.  E. H. GREIBACH  1,973,410
HEARING AID DEVICE
Filed Aug. 10, 1931  3 Sheets-Sheet 1
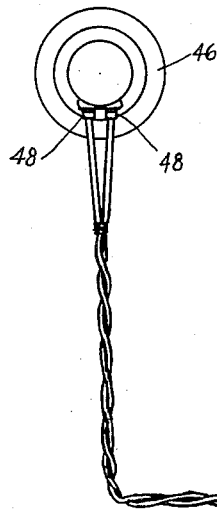
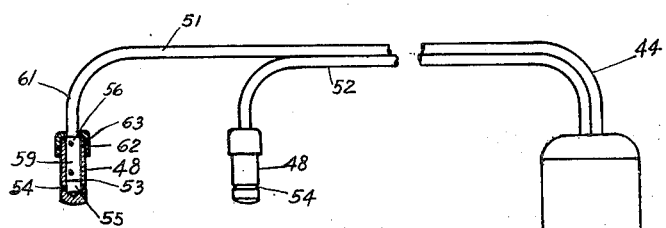
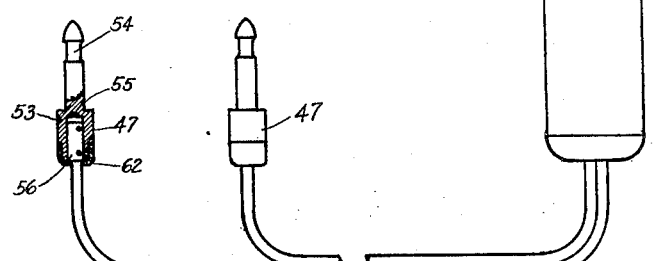
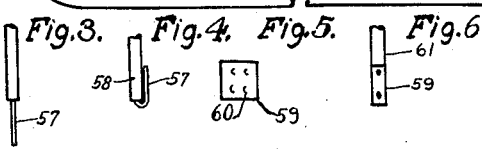
INVENTOR.
E. H. GREIBACH
BY Cromwell, Greist & Warden
ATTORNEYS.

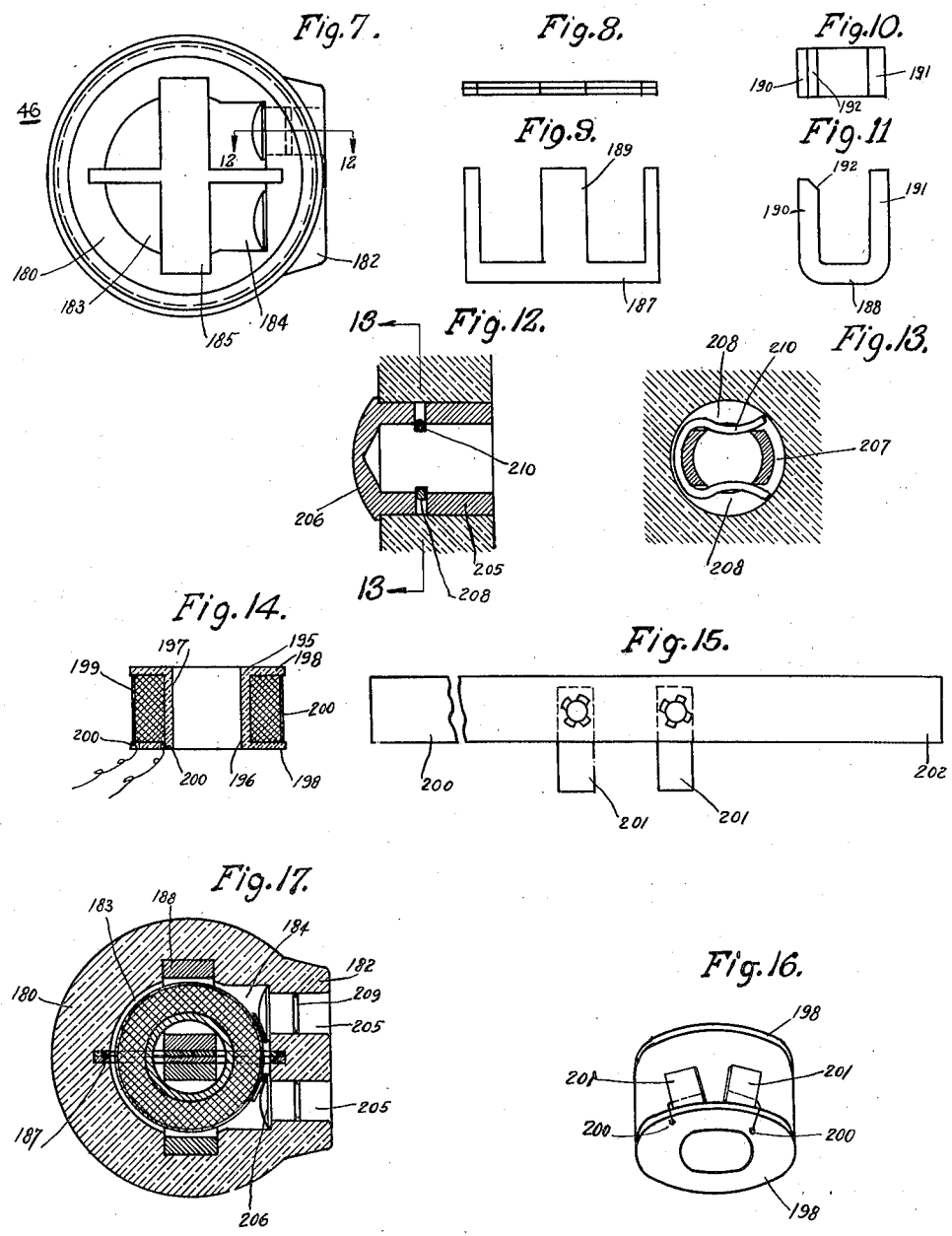

Sept. 11, 1934.   E. H. GREIBACH   1,973,410
HEARING AID DEVICE
Filed Aug. 10, 1931   3 Sheets-Sheet 3
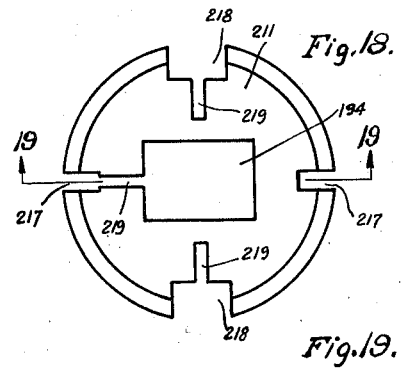
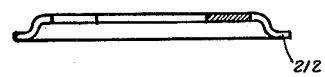
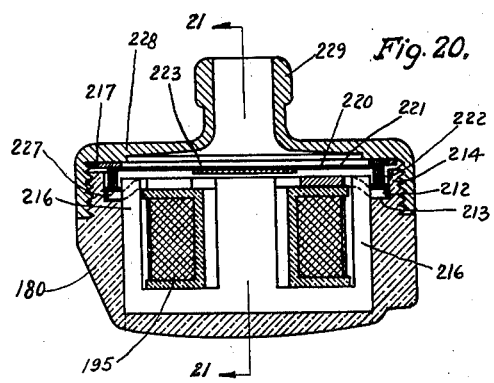
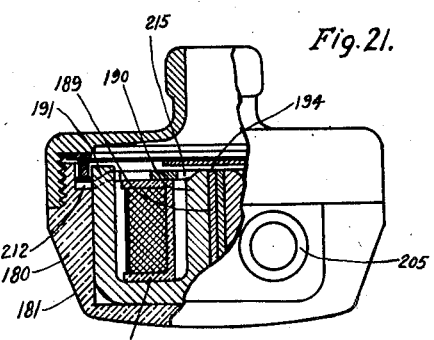
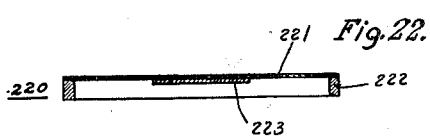
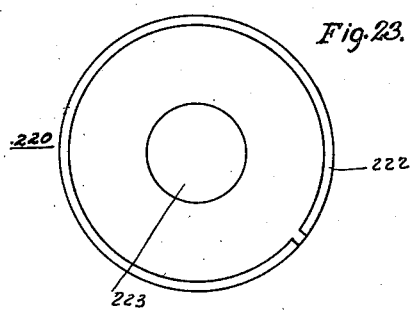
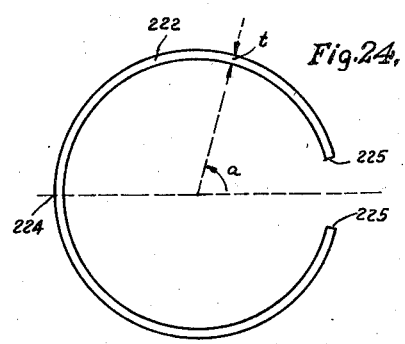
INVENTOR.
E. H. GREIBACH
BY
ATTORNEYS.

Patented Sept. 11, 1934

1,973,410

UNITED STATES PATENT OFFICE 1,973,410

HEARING-AID DEVICE

Emil Henry Greibach, Brooklyn, N. Y., assignor to Sonotone Corporation, New York, N. Y., a corporation of New York Application August 10, 1931, Serial No. 556,158

7 Claims. (Cl. 179—107)

This application is a continuation in part of my copending application Serial No. 462,907 filed June 21, 1930.

This invention relates to hearing-aid devices for deaf and hard-to-hearing persons, although some of the features of the invention are not limited thereto.

Among the objects of the invention is the provision of a portable hearing-aid device that efficiently transmits and reproduces sound, is small and convenient to carry inconspicuously on the person, is mechanically strong and resistant to continuous handling by a user, has few parts readily detachable and interchangeable, and is economic and simple in manufacture, assembly and repair.

The foregoing and other objects of the invention will be best understood from the following description of exemplification thereof, reference being had to the accompanying drawings in which Fig. 1 is a diagrammatic view of a completely assembled hearing-aid device embodying the invention;

Fig. 2 is a somewhat enlarged view of the connecting cord with the plugs and resistor-cutout shown in section;

Figs. 3 and 4 are detailed views illustrating successive steps in preparing the end of a cord strand for mounting in the plug;

Fig. 5 is a view of the clip plate before it is clamped over the end of the cord strand in the form of a clip;

Fig. 6 is a view of the end of the cord strand in completed position before mounting in the plug;

Fig. 7 is a top view of the open casing of the receiver telephone of the device before the parts are assembled therein;

Figs. 8 and 9 are top and side views, respectively, of the soft iron core of the receiver telephone;

Figs. 10 and 11 are top and side views, respectively, of the permanent magnet cores used in the receiver telephone;

Fig. 12 is a cross sectional view through a portion of the receiver casing along line 12—12 in Fig. 7, showing the mounting of the terminal bushing;

Fig. 13 is a sectional view of the bushing along the lines 13—13 of Fig. 12;

Fig. 14 is a cross sectional view of the inducing coil of the receiver;

Fig. 15 is a plan view of the cover strip of the inducing coil with the two terminal strips mounted thereon;

Fig. 16 is a perspective view of the completed coil in assembled condition;

Fig. 17 is a transverse sectional view through the receiver casing and the assembled parts;

Fig. 18 is a top view of the pole plate of the receiver;

Fig. 19 is a cross sectional view through the pole plate of Fig. 18 along line 19—19;

Fig. 20 is a vertical sectional view through a completely assembled receiver telephone;

Fig. 21 is a partially sectional view of the complete receiver along the line 21—21 of Fig. 20;

Fig. 22 is a vertical sectional view through the vibratory unit of the receiver;

Fig. 23 is an elevational view of the vibratory unit as seen from the underside in Fig. 22;

Fig. 24 is an elevational view of the tension ring of the vibratory unit prior to the assembling.

The exemplification of the invention, as shown in assembled form in Fig. 1, comprises a transmitter or microphone unit 41 attached through an intermediary adapter swivel 42 to a supply battery 43 and connected through a two-conductor cord 44 having a built-in cutout and resistor unit 45 to a receiver telephone 46. The microphone is connected through the adapter swivel 42 and the connecting cord 44 in series with the battery 43 and the receiver telephone 46 so that speech and other sound produces variations of the current supplied from the battery 43, and thereby varies the current passed through the receiver 46 so as to reproduce in the ear of the person wearing it sounds corresponding to the input sounds into the transmitter 41. The cutout and resistor unit 45 is included in the series circuit leading to the receiver 46 so as to permit opening of the circuit and stopping the current flow as well as the regulation of the intensity of the sound current. The cord 44 has at its opposite ends a set of microphone plugs 47 and a set of receiver telephone plugs 48 to permit ready detachment and attachment of the several parts, and the microphone unit 41 may be readily pulled out from the adapter swivel 42 and the latter out from the battery 43. These several detachable parts are of extremely small size, the several parts being drawn to scale, and a characteristic dimension being indicated in the drawings so that the other dimensions may be readily taken therefrom. Thus, the total outer diameter of the round part of the receiver 46 is only .875 inch.

This diminutive size of the receiver is made necessary by the desire of the persons using the hearing-aid to wear on the ear something that is as inconspicuous as possible. At the same time the receiver must also be built to reproduce the sound that is to be imparted to the ear and give the aid for which it is used. An enormous problem is thus presented in placing within the diminutive space the material and elements necessary to produce the sound in the ear of the wearer and to produce it in accordance with the sound input, following faithfully its continuous variations.

Because of these reasons, the problem of connecting the cord to the inducing coil of the receiver telephone is extremely difficult. The cord should be held in the receiver so as to normally secure a good electrical as well as a good mechanical connection, since the wearer is naturally inclined to pull either on the cord or on the telephone receiver, thus imposing an unusual strain on the connection. As far as I am aware, it has been the practice heretofore to carry the cord ends directly into the diminutive, or, as it is generally called, midget telephone casing, permanently fasten the cord in the casing in some way, and to solder the cord wires to the coil ends. The cord was thus permanently attached to the midget receiver and any break in a cord lead made the entire unit inoperative until the repair was made. Furthermore, on account of the permanent connection, there was greater strain imposed upon the connection between the cord and the lead and there was usually great trouble on account of the cord tearing out from the midget receiver casing. When this occurred, it was always necessary to open the tiny receiver and to perform the complicated operation of again connecting the cord conductors and the cord in place.

One feature of the invention resides in a new arrangement of the cord and the cord connection with the midget receiver, whereby the cord ends may be readily attached and detached to permanent terminals in the midget receivers, the connections being such as to stand the normal strain in use, but the cord ends being readily detachable upon exercise of any appreciable strain on the cord without in any way impairing the functioning of the device. A distinct feature of the invention is also the special construction of the plugs used on the cord unit and the mounting of the resistor and cutout unit on the cord. This will now be described by reference to Figs. 2 to 6. The cord connection 44 is made of two strands 51 and 52, strand 52 being continuous and strand 51 being open and having included therein a resistor and cutout housed in the resistor and cutout unit 45. At the ends of the strands 51 and 52 are mounted the two sets of microphone plugs 47 and receiver plugs 48, each set of plugs being polarized, one plug pin being somewhat different than the other, for instance, larger, so that the connection between the cord ends and the receiver and microphone units can be made only in a definite way, each plug to its own socket opening.

The strands of the cords are made so as to be flexible and yet strong and capable of withstanding the strain and wear to which they are subject in the continuous use. The usual strands are composed of a core consisting of three or more intertwisted flexible conductors made by winding thin copper filaments over a thread so as to have the required conductivity and yet retain great strength. This core has wound thereon additional layers of flexible insulating material, such as silk, and is enclosed by a cover consisting, for instance, of suitably woven silk threads so as to thoroughly protect the conducting core in the interior and at the same time carry the strain imposed on the strands in use by pulling it, etc.

The plugs 47 and 48 are of special construction and connected to the ends of the cord strands in a special way so as to secure a good conducting connection between the plugs and the conducting core of the strands, and at the same time also secure a good mechanical connection so as to prevent pulling out of the strands from the plugs. Each of the plugs has a longitudinal plug pin 53 having at one end a portion 54 curved to engage the cooperating socket terminal. The interior of the plug pin 53 is hollow and forms a longitudinal chamber 55 having an opening 56 at the end opposite the contact end 54. Into this hollow chamber 55 is inserted the end of the cord strand, and to this end the strand is prepared, as indicated in Figs. 3 to 6. The insulating cover of the strand is removed over a portion of its length near the end, as shown in Fig. 3, exposing the core 57. This core portion 57 is then folded over the portion 58 next to it, on which the cover was left intact, as indicated in Fig. 6. Then a little sheet metal plate 59 having punched on its surface a few holes 60, so as to provide projecting grips, is folded around the prepared strand end, shown in Fig. 4, to form a surrounding sleeve-like clip which is firmly clamped around the strand end and grips with its punched projections the surface of the cover and at the same time makes a good conducting connection with the folded over cord filaments 57, the completed unit being shown in Fig. 6, where the clip 59 in its final position is shown to be approximately of the same diameter as the uncompressed adjacent portion 61 of the strand.

Before securing clip 59 on the strand end, a collar 62, as shown on the plugs in Fig. 2, is first slipped on the strand end so that when the clip is mounted the collar slides freely back of it. The strand end with the clip mounted thereon is then slipped into the chamber 55 of the plug pin 53, as shown in Fig. 2. With the clip placed inside, the portion of the pin walls near the opening is compressed or clamped together so as to firmly lock the clip strand end in the chamber to prevent its being pulled out of it. Preferably, the end portion of the pin near its end has a small cut 63 along a portion of its periphery so that the portion near the end of the pin may be more readily clamped together and caused to lock the clipped strand end firmer in the pin. The collar 62 which has a press fit over the pin end is then forced in place and the mounting of the plug on the strand end thus completed. The finished unit is extremely simple in manufacture, gives an excellent conducting connection between the conducting core of the strand and the plug pin, provides a strong positive mechanical connection between the plug pin and the cord strand, and has a pleasing neat appearance.

The midget telephone receiver 46 for the hearing-aid device and its details, as shown in Figs. 7 to 21, are of special construction so as to assure easy assembly and manufacture, efficient sound reproduction, while keeping the size of the unit down so that it is inconspicuous when worn on the ear. The receiver comprises a casing 180 of insulating material, such as molded bakelite, having an annular shape. As stated before, the outer diameter of the annular casing that is now in use is only .875 inch. The lower end of the casing is tapered down at 181 to secure better appearance and is provided at one side with a projecting ledge portion 182 terminating in a flat end surface. The interior of the casing has formed therein a hollow cylindrical chamber 183 merging into a rectangular extension 184 opposite the ledge portion 182. The sides and the bottom of the chamber 183 are further provided with a wide groove 185 and a relatively narrow groove 186 for mounting the elements of the magnetic system of the receiver.

The magnetic system comprises a plurality of E-shaped soft iron laminations 187, in the instance illustrated, two laminations, as shown in detail in Figs. 8 and 9; and a pair of U-shaped permanent magnets 188, of highly retentive material, such as cobalt steel or the like, shown in detail in Figs. 10 and 11. The soft iron laminations are assembled side by side and inserted in the narrow slot 183 of the casing as shown in Fig. 17, and the two permanent magnets 188 are assembled in a direction perpendicular to the soft iron core on both sides of the center piece 189 of the soft iron laminations, as shown in Fig. 17. It will be noted that the two arms of the U-shaped permanent magnets are somewhat different at their ends, the arm 190 leaning against the center portion of the soft iron core being somewhat shorter than the outer arm 191 and being bevelled on the inner side at 192. When so assembled, as shown in Figs. 17, 20 and 21, the soft iron and the permanently magnetized core members constitute a magnetic system which has a center portion 193 formed of a central soft iron core member constituting by the center pieces 189 of the soft iron laminations 187 and the two directly abutting arms 190 of the permanent magnets 188. By beveling off the inner sides of the central permanent magnet arms 190, the pole surface 194 of the central core member is somewhat reduced so that the flux of the permanent magnet core members 190 is forced through the pole area of the soft iron core members 189, thereby causing the permanent flux produced by the permanent magnets 188 and the flux produced by induction in the soft iron cores 187 to intimately intermingle at the pole surface 194.

As seen in Figs. 17, the soft iron core members 187 and the permanent magnet members 188 when mounted in their grooves in casing 180 leave free in the casing chamber 183 a circular space around the central core member. Within this cylindrical space between the magnet core arms is mounted an inducing coil 195 shown in detail in Figs. 14 to 16. The coil comprises a spool 196 having a central hollow spool core 197 and two spool heads 198 between which is wound an inducing coil 199 of fine wire, the begining and the end of the coil being brought out through perforations 200 on the lower spool head 198. Upon completion of the winding of the coil, the windings are covered by a strip 201 of oil cloth or similar insulating material wound around the coil turns. The strip is held in place by pasting on its ends a suitable adhesive material, for instance, shellac or the like. The strip 200 is shown in detail in Fig. 15 and has secured to it, spaced from each other, two contact strips 201 of springy sheet metal, such as phosphor-bronze. A good connection between the contact strips 201 and the insulating strip 200 may be obtained by simply punching holes through the two overlying strips, as shown in Fig. 15, and causing the projections of the metallic strips 201 formed through the punching operation to penetrate through the fabric strip 200 and overlap the same on the opposite side. This operation is extremely simple and secures a good connection between the contact strip and the fabric strip. Futhermore, in winding the fabric strip 200 over the spool, the length of the strip portion in front of the contact strip 201 is made sufficient to have the parts of the contact strip 201 underlying the fabric strip 200 in Fig. 15 overlie the preceding portion of the fabric strip 200 so that when the end 202 of the fabric strip is pasted in place, the two contact strips 201 are firmly held on the periphery of the coil between the layers of the fabric strip 200. After the strip 200 is firmly pasted in place, the contact strips 201 project downwardly along the periphery of the assembly coil over the edge of the lower spool head 198. The two ends of the inducing coil 199 projecting through the holes 200 of the lower spool head are then soldered over the surfaces of the projecting contact strip portions 201 near the point where they emerge from the fabric strip 200, thereby establishing connection between the two coil ends and the two contact strips and the contact strips are then bent upwardly over the coil, as shown in Fig. 16, the spring action of the strips tending to press them outwardly.

The casing 180 is further provided on its ledge portions 182 with two contact bushings 205 shown in detail in Figs. 12 and 13. The bushing has the form of a hollow metallic sleeve open at one end and provided with a rounded head 206 at the other end. A short distance in front of the head 206 a thin groove 207 is cut into the outer surface of the bushing sleeve 205, as indicated in Fig. 13, the groove being cut through the full thickness of the sleeve on the two opposite sides of the sleeve at 208. Over the bushing sleeve is mounted a U-shaped spring 209 having its back portion shaped to fit into the groove 207 and its side arms 210 inwardly bent to fit into the completely cut portions 208 of the bushing sleeve and to project yieldingly into the space of the interior of the bushing sleeve. The inner diameter of the bushing sleeve openings is such that the plugged pins 48 of the cord unit 44 shown in Fig. 2 fit into the sleeve openings and the grooves 54 of the plug pins become engaged by the yielding arms 210 of the bushing springs 209. In this way a very firm and reliable electrical and mechanical connection may be effected between the bushing sleeves and the plug pins 48 of the connecting cord 44.

The bushing spring 209 when mounted in place in its groove sits firmly on the bushing because the bent-in arms 210 prevent the spring from falling off. Before assembling the coil and the magnet in the receiver casing 180, the contact bushings 205 are inserted into the longitudinal perforations provided in the ledge portion 182 of the casing, as shown in Fig. 25, the bushing heads 206 leaning with their edges against the inner edges of the bushing holes of the casing. In order to lock the bushing firmly in place, the outer edge of the opening may be slightly enlarged by spinning it over with a suitable tool so that the bushings 205 are firmly locked in place. With the bushings so mounted in place within the casing and the soft iron and permanent magnet members assembled in their grooves within the casing, the inducing coil 195 is mounted in its place by merely shoving it into the circumferential part of the casing chamber 183, as indicated in Fig. 17, the two contact strips 201 of the coil automatically establishing a reliable electrical conducting connection between the ends of the coil and the two bushing sleeves 205 so that by inserting the plugs 48 into the bushing sleeves, a positive contact with the coil may be established. In this way, my arrangement permits quick detachable connection and disconnection of the connecting cord to the diminutive telephone, eliminating necessity for soldering the cord ends to the coil and complicated mechanical securing of the cord ends within the casing. At the same time simple assembly of the magnetic and electrical parts within the casing is secured and economic manufacture as well as reliable operation thereby obtained.

Over the top of the assembled magnet and coil structure is placed a pole plate 211 made of soft iron so as to form a cover over the chamber 183 formed within the casing, the edges 212 of the pole plate being depressed downwardly so as to rest against the upper edge 213 of the casing walls, within the circular opening formed by the projecting circular shoulder 214 of the casing which is provided on its exterior with a threaded surface slightly recessed against the outer circular periphery of the casing 118. The pole plate has a rectangular opening in the center larger than the pole face 194 of the central core member so as to leave a gap 215 between the inner edges of the opening and the edges of the pole face 194 of the central core of the magnet system. At the point of the periphery of the pole plate opposite the ends of the outer arms 216 of the soft iron core members and opposite the ends of the outer permanent magnet arms 191, the plate is provided with rectangular cutouts 217, 218 conforming in outline to the cross section of the outer arms of the magnet members so that the flux from the outer soft iron core members and permanent magnet members may enter into the pole plate and pass therealong to the central main gap 215 over which the plugs have then to cross towards the central core member of the magnet system. The junctions between the outer ends of the soft iron core members 216 with the adjacent portions of the pole plate around the cutouts 217 form slight gaps so as to constitute points of relatively high reluctance preventing excessive flow of shunting flux between the inner and outer pole ends of the permanent magnets 188 by way from the central arm of the permanent magnet through the adjacent soft iron core members 189, then through said soft iron core members to the outer arms 216 thereof, and then through the body of the pole plate to the outer arms of the permanent magnet member. By making the junction between the ends of the outer soft iron core members with the pole plate 211, at the cutouts 217, of sufficiently high magnetic reluctance, this shunt flux may be reduced to the proper value as explained more fully hereinafter. The radial slots in the pole plate prevent eddy currents.

Above the pole plate is mounted the diaphragm unit 220 comprising a thin circular resilient sheet 221, of phosphor bronze or sheet steel, for instance, which is held under uniform circumferential tension by a tension ring 222 shown in detail in Figs. 30 to 32. At the center the resilient diaphragm 221 carries a soft iron armature 223 in the form of a circular disk which has its back surface soldered or otherwise joined to the underside of the diaphragm 221. In order to give the diaphragm the correct tension while securing a structure of utmost simplicity and easy to manufacture, the tension ring is made of a body of steel or similar material of larger diameter than the diameter of the diaphragm, the tension ring for the diaphragm shown in Figs. 22 and 23 being, for instance, shown in its normal condition in Fig. 24. A part of the ring periphery is cut out so that when the edges of the ring shown in Fig. 24 are brought close to each other, the ring assumes the form in which it is seen in Fig. 23. In making the diaphragm unit, the ring is compressed to the proper diameter and placed in a fixture having a depression equal to the height of the ring and a diameter equal to the diameter of the diaphragm 221. The diaphragm 221 is then placed over the ring and soldered at its edge to the ring so that, after the soldering, the ring with the diaphragm may be taken out of the fixture, the ring 222 trying to return to its normal position as shown in Fig. 24 and thus stretching the diaphragm skin 221 in all directions. The fixture for soldering the diaphragm 221 to the ring 222 may be combined with the fixture for soldering the armature 223 to the diaphragm, the fixture having simply in the center another depression for housing the diaphragm 223, the two soldering operations being performed together.

If the spring ring has a uniform thickness, the radial tension of the diaphragm 221 will not be quite uniform in the different radial directions. In order to secure uniform stretching in all directions, the ring is made with a thickness which decreases uniformly from the center point of the ring at 224 towards its two ends 225. The correct thickness of the ring to secure uniform tension in the diaphragm can be determined from the formula $$t = c\left(\sin^2 \frac{a}{2}\right)^{1/3}$$

where "$t$" is the thickness at a point of the periphery under the angle "$a$" and "$c$" is the thickness of the ring at the center portion 224. The height of the spring ring 222 is so chosen that when mounted in place, as shown in Figs. 28 and 29, the armature 223 is spaced a short distance above the pole face 194 so that it is free to swing up and down. To secure the proper spacing of the armature 223 from the pole face 194, one or more washers 227 may be inserted between the outer edge of the pole plate 211 and the bottom side of the tension ring 222. The assembly of the receiver unit is completed by placing a second washer 217 over the top edge of the diaphragm 221 and screwing over it a cover member 228 having a peripheral portion screwed over the threaded shoulder 214 of the casing 180. The cover 228 may be made of metal, such as aluminum, and the outer dimensions are made so that it conforms to the outer contours of the casing 180 and gives the appearance as if it were a single unit. The central portion of the cover 228 is shaped so as to provide a small sound chamber in front of the diaphragm, there being an upwardly projecting perforated nipple 229 at the center of the cover. This nipple may be either directly placed in the ear or have another rubber nipple fitting the ear clamped over it so as to cause the column of air impelled by the movement of the diaphragm 221 to act directly into the auditory passage within the ear.

The features of the invention described above are susceptible of many modifications that will suggest themselves to those skilled in the art.

I claim:

1. An ear telephone comprising a casing having a hollow interior chamber, a magnetic core in said casing, a rigid self-supporting inducing coil arranged to be slid into a predetermined space in said casing to induce flux changes in said core, a diaphragm disposed adjacent said core for actuation by flux changes in said core, clamping means on said casing holding in place the elements in the interior of the casing, and a pair of metallic terminal members extending from the interior to the exterior of said casing and insulatingly held thereon, said members having exteriorly accessible portions for making detachable contact with external circuits and inner contact surfaces exposed to the interior of said casing, said coil having insulatingly mounted thereon contact members connected to the terminals of said coil, said coil contact members and the contact surfaces of said terminal members being disposed in alignment and mounted to secure contact under pressure between said coil contact members and said terminal contact surfaces, respectively.

2. A midget ear telephone adapted to be carried on the ear of the listener comprising an insulating casing having a hollow interior chamber, a magnetic core in said casing, a rigid self-supporting inducing coil arranged to be slid into a predetermined space in said casing to induce flux changes in said core, a diaphragm disposed adjacent said core for actuation by flux changes in said core, clamping means on said casing holding in place the elements in the interior of the casing, and a pair of metallic terminal members extending from the interior to the exterior of said casing and insulatingly held thereon, said members having exteriorly accessible portions for making detachable contact with external circuits and inner contact surfaces exposed to the interior of said casing, said coil having insulatingly mounted thereon contact members connected to the terminals of said coil, said coil contact members and the contact surfaces of said terminal members being disposed in alignment and mounted to secure slidable contact under pressure between said coil contact members and said terminal contact surfaces, respectively, on sliding said coil into place.

3. A midget ear telephone adapted to be carried on the ear of the listener comprising an insulating casing having a hollow interior chamber, a magnetic core in said casing, a rigid self-supporting inducing coil arranged to be slid into a predetermined space in said casing to induce flux changes in said core, a diaphragm disposed adjacent said core for actuation by flux changes in said core, a detachable cover on said casing holding in place the elements in the interior of the casing, and a pair of metallic terminal sleeves extending through said casing walls and held therein, said sleeves having exteriorly accessible axial perforations for receiving and detachably engaging contact plugs of external circuits and inner contact surfaces exposed to the interior of said casing, said coil having insulatingly mounted thereon contact members connected to the terminals of said coil, said coil contact members and the contact surfaces of said terminal sleeves being disposed in alignment and mounted to secure slidable contact under pressure between said coil contact members and said terminal contact surfaces, respectively, on sliding said coil into place.

4. A midget ear telephone adapted to be carried on the ear of the listener comprising an insulating casing having a hollow interior chamber, a magnetic core in said casing having a plurality of arms extending axially along the periphery of said chamber, a rigid self-supporting inducing coil arranged to be slid into a predetermined space within said arms to induce flux changes in said core, a diaphragm disposed adjacent said core for actuation by flux changes in said core, a detachable cover on said casing holding in place the elements in the interior of the casing, and a pair of metallic terminal members extending from the interior to the exterior of said casing and insulatingly held thereon, said members having exteriorly accessible portions for making detachable contact with external circuits and inner contact surfaces exposed on the interior wall of said casing between said core arms, said coil having insulatingly mounted thereon contact members connected to the terminals of said coil, said coil contact members and the contact surfaces of said terminal members being disposed in alignment and mounted to secure slidable contact under pressure between said coil contact members and said terminal contact surfaces, respectively, on sliding said coil into place.

5. A midget ear telephone adapted to be carried on the ear of the listener comprising an insulating casing having a hollow interior chamber, a magnetic core in said casing having a plurality of arms extending axially along the periphery of said chamber, a rigid self-supporting inducing coil arranged to be slid into a predetermined space within said arms to induce flux changes in said core, a diaphragm disposed adjacent said core for actuation by flux changes in said core, a detachable cover on said casing holding in place the elements in the interior of the casing, and a pair of metallic terminal sleeves extending through said casing walls and held therein, said sleeves having exteriorly accessible axial perforations for receiving and detachably engaging contact plugs of external circuits making detachable contact with external circuits and inner enlarged heads constituting contact surfaces exposed on the interior wall of said casing between said core arms, said coil having insulatingly mounted thereon contact members connected to the terminals of said coil, said coil contact members and the contact surfaces of said terminal sleeves being disposed in alignment and mounted to secure slidable contact under pressure between said coil contact members and said terminal contact surfaces, respectively, on sliding said coil into place.

6. A portable electric hearing-aid device of small size suitable for inconspicuous wear for imparting sound sensations to the auditory center in the head of a person hard of hearing, comprising a casing having a hollow interior chamber, a magnetic core in said casing, an armature disposed adjacent said core for actuation by flux changes in said core, a rigid self-supporting inducing coil interlinked with said core and armature for inducing flux changes therethrough and positioned to be inserted into a predetermined space in said casing to induce said flux changes, clamping means on said casing holding in place the elements in the interior of the casing, a pair of metallic terminal members extending from the interior to the exterior of said casing and insulatingly held thereon, said members having exteriorly accessible portions for making detachable contact with external circuits and inner contact surfaces exposed to the interior of said casing, said coil having insulatingly mounted thereon contact members connected to the terminals of said coil, said coil contact members and the contact surfaces of said terminal members being disposed in alignment and mounted to secure contact under pressure between said coil contact members and said terminal contact surfaces, respectively.

7. A portable electric hearing-aid device of small size suitable for inconspicuous wear for imparting sound sensations to the auditory center in the head of a person hard of hearing, comprising a casing having a hollow interior chamber, an electrically actuated oscillator unit mounted in said chamber including an energizing circuit having a pair of energizing contact members positioned to be inserted into a predetermined space in the interior of said casing, a pair of metallic terminal members extending from the interior to the exterior of said casing and insulatingly held thereon, said terminal members having exteriorly accessible portions for making detachable contact with external circuits and inner contact surfaces exposed to the interior of said casing, said oscillator circuit contact members and the inner terminal contact surfaces of said terminal members being disposed in alignment and mounted to secure contact under pressure between said oscillator circuit contact members and the inner contact surfaces of said terminal members.

EMIL HENRY GREIBACH.